(12) United States Patent
Stevens (10) Patent No.: US 6,390,412 B1
(45) Date of Patent: May 21, 2002

(54) METHOD AND DEVICE FOR ASSISTING THE PILOT IN CONTROLLING THE TURBOSHAFT POWER AND/OR ROTOR SPEED OF HEAT-PROPELLED HELICOPTERS

(75) Inventor: René Stevens, Marignane (FR)

(73) Assignee: Bonnans S.A. (Societe Anonyme), Marseille (FR)

( * ) Notice: Subject to any disclaimer, the term of this patent is extended or adjusted under 35 U.S.C. 154(b) by 0 days.

(21) Appl. No.: 09/462,803

(22) PCT Filed: Jul. 16, 1998

(86) PCT No.: PCT/FR98/01554

§ 371 Date: Jan. 14, 2000

§ 102(e) Date: Jan. 14, 2000

(87) PCT Pub. No.: WO99/03728

PCT Pub. Date: Jan. 28, 1999

(30) Foreign Application Priority Data

Jul. 18, 1997 (FR) ............................................ 97 09391

(51) Int. Cl.[7] .............................................. B64C 11/34
(52) U.S. Cl. .................. 244/17.13; 244/17.11; 244/76 R; 244/195
(58) Field of Search ........................... 244/17.11, 17.13, 244/76 R, 194, 195, 196, 223, 224, 17.25; 416/46

(56) References Cited

U.S. PATENT DOCUMENTS 4,564,908 A * 1/1986 Clelford et al. ............. 364/433
5,076,517 A * 12/1991 Ferranti et al. ............. 244/228
5,853,152 A * 12/1998 Evans et al. ................ 244/221

FOREIGN PATENT DOCUMENTS

| EP | 265738 | * | 1/1983 |
| EP | 265738 | | 5/1988 |
| FR | 2476013 | | 8/1981 |
| GB | 1142541 | | 3/1966 |
| GB | 2192163 | | 1/1988 |

* cited by examiner

Primary Examiner—Michael J. Carone
Assistant Examiner—Timothy D. Collins
(74) Attorney, Agent, or Firm—Greenblum & Bernstein, P. LC.

(57) ABSTRACT

Helicopter, device, and method of controlling helicopter using a computer, at least one motorized mechanical stop, and a collective pitch lever for controlling flight. The device includes a computer, a collective pitch lever, and at least one motorized mechanical stop controlled by the computer. The at least one motorized mechanical stop is adapted to obstruct the free movement of the collective pitch lever. The method includes detecting, using the computer, a deviation between a rotor speed limitation and a current speed, and actuating, using the computer, the at least one motorized mechanical stop. The at least one motorized mechanical stop is adapted to obstruct the free movement of the collective pitch lever.

44 Claims, 6 Drawing Sheets

METHOD AND DEVICE FOR ASSISTING THE PILOT IN CONTROLLING THE TURBOSHAFT POWER AND/OR ROTOR SPEED OF HEAT-PROPELLED HELICOPTERS

BACKGROUND OF THE INVENTION

1. Field of the Invention

The present invention relates to a method and a device for assisting in controlling, by acting on the collective pitch, the power transmitted to the rotor(s) of helicopters by the engine or engines and the transmission, and/or the rotor speed in autorotation. The invention also relates to heat-propelled helicopters equipped with such a device or using such method.

2. Description of Background and Relevant Information

The driving of the rotors of heat-propelled helicopters requires a drive power that must be precisely controlled, since this power varies or should vary in accordance with various parameters (e.g., pilot demand, flight conditions, temperature, atmospheric pressure, etc.).

Moreover, there are limitations which must not be exceeded, without which the turboshaft engine(s) and/or the transmission could sustain damages which are dangerous to the integrity of the helicopter. These limitations may be grouped into two categories:

- mechanical limitations: wherein the maximum torque that the transmission can transmit without sustaining damage (for example, damage to the reduction gear located at the output of the drive shaft of the turboshaft engine);
- thermal limitations, which are measured:
  - either by the maximum generating speed of the gas generator;
  - or by the maximum temperature of the gasses in the turbine or turbines.

The helicopter pilot must control the power transmitted to the rotor(s) by the turboshaft engine(s) and by the transmission by utilizing the collective pitch in order to ensure that these limitations are not exceeded. To accomplish this, the pilot limits the upward movement of the collective pitch so as not to exceed the mechanical limitations of the transmission and the mechanical or thermal limitations of the turboshaft engine(s) indicated above.

In "Turbomeca" engines (Registered Trademark), the first thermal limitation reached is the maximum generating speed of the gas generator, and except in case of damage to the engine, the maximum temperature of the gasses is not reached until after that. Such an engine is said to be Ng-controlled (also known as N1-controlled).

However, most foreign engines generally function in the opposite manner. Such engines are said to be "t4"-controlled or "t45"-controlled.

In order to observe the status of all of these limitations, the pilot has on the instrument panel several indicators, which can have multiple needles. In all phases of the flight, the pilot must make sure that none of these limits are exceeded. In the take-off and landing phases, in which it is additionally especially necessary to look outside the helicopter, and in which the helicopter often experiences the limits of its capabilities, this is a relatively difficult task which requires the concentration of the pilot.

To make this task easier, retractable stops have been used in certain single-engine aircraft. For example, in "Gazelle" and "Dauphin" aircraft (Registered Trademarks), these stops are preset by the pilot as a function of the exterior temperature.

Unfortunately, this type of stop can only protect the engine thermally, and only for a given type of flight: e.g., vertical flight is generally chosen for such protection. In essence, the power required by the rotor for a given collective pitch depends on several parameters, i.e., essentially on the atmospheric pressure, the exterior temperature and the travel speed of the helicopter. However, this type of stop does not protect the transmission from the harmful effects of excessive torque, at low altitude, and/or when the transmission is cold.

One object of the present invention is to overcome these drawbacks.

SUMMARY OF THE INVENTION

According to the invention, there is provided a method according to which the approach and/or exceeding of a first limitation reached is detected by a computer programmed to actuate a motorized mechanical stop, producing the formation of a hard point countering the continuation of the upward pivoting movement of the collective pitch lever.

According to another characteristic of the invention, this method makes it possible to control the rotor speed of a helicopter in autorotation, and is remarkable in this application in that, upon detection of the approach and/or exceeding of the desired rotor speed by way of a computer programmed for this purpose, the computer is also programmed to activate a motorized mechanical stop preset to a predetermined value of the collective pitch, in order to produce the formation of a hard point or stop constituting an obstacle to the free continuation of the downward pivoting movement of the collective pitch lever.

The invention also provides for a device for assisting the pilot in controlling the power limitations of the turboshaft engine or engines of heat-propelled helicopters. Such a device is remarkable in that it comprises a motorized mechanical stop producing the formation of a hard point or stop countering the continuation of the upward pivoting movement of the collective pitch lever, this motorized mechanical stop being activated by a computer programmed to detect the deviation between the limitations and the corresponding power parameters, to select the greatest one, and to actuate the stop as soon as any of the power limitations are reached or exceeded.

The device for assisting the pilot in controlling the rotor speed of heat-propelled helicopters according to the invention is particularly remarkable in that it comprises a motorized mechanical stop producing the formation of a hard point or stop countering the continuation of the downward pivoting movement of the collective pitch lever, this motorized mechanical stop being activated by a computer programmed to detect the deviation between the limitation of the rotor speed and the current speed, and to actuate the stop as soon as the maximum rotor speed setting given to the computer is reached or exceeded.

According to another characteristic of the invention, the above-mentioned method and device are also remarkable in that the hard point or stop created by the motorization actuated by the computer can be bypassed through the action of a friction coupling placed between the stop or stops and the motorization, in order to allow the pilot to bypass this stop in case of emergency.

According to another characteristic of the invention, the motorized mechanical stop system comprises an electric motor that drives an irreversible reduction gear linked to the collective pitch lever by way of a linkage or transmission, and in that the electromechanical elements of the motorized stop system are placed on an element of the linkage or transmission, this element being constituted in two parts assembled with an ability to move relative to one another, one of these parts being equipped with the stop or stops, while the other carries a stopping device that can be brought into contact with the stop, or with any of the stops, which comprise(s) an electrical system for detecting contact with the stopping device, the stop or stops preferably being adjustable.

From the preceding description, it is clear that the method and the device of the invention can use a system with a single motorized mechanical stop, either to control the power limitations of the turboshaft engine or engines of the helicopter, or to control the rotor speed of the engine.

However, a global solution offered by the invention provides for, in an especially interesting way, creating two mechanical stops motorized by the same motorization mechanism discussed above, and of subjecting them to the first limitation reached in the type of flying that the helicopter is experiencing, and it is this highly advantageous solution that is described in the following description.

Thus, the pilot need only maintain a slight upward pressure on the collective pitch lever to obtain the maximum allowable power. If the pilot releases this pressure and a power limitations is reached, the control system will reduce the collective pitch so that this limitations is not exceeded, but will not accordingly increase the power when it is reduced. It may be said that the pilot is the motoroperator of this control system, which allows him at any time, and without looking at his instruments, i.e., inside, to avoid exceeding the limitations while remaining in the "control loop".

The same device, when the computer receives the rotor speed, can assist in controlling the rotor speed in autorotation. In essence, the lower collective pitch stop must be set so as to provide enough rotor speed in autorotation at its minimum mass, for the low altitude and the minimum temperature at which it is rated. Conversely, when the aircraft is full, if it is flying high and it is hot, and/or if the pilot maintains the pitch at the lower stop, the maximum allowable rotor speed can be easily exceeded. With the method and the device according to the invention, the pilot need only maintain a slight downward pressure on the collective pitch in order to obtain the maximum speed setting that has been given to the computer.

Of course, in any case, a spring or friction device will allow the pilot to bypass this stop in case of emergency.

According to another aspect of the invention, there is provided a method for assisting in controlling at least one power limitation of a helicopter using a computer, at least one motorized mechanical stop, and a collective pitch lever for controlling flight, the method comprising detecting, using the computer, a deviation between the at least one power limitation and at least one corresponding power parameter, selecting, using the computer, a greater one of the at least one power limitation and the at least one power parameter, and actuating, using the computer, the at least one motorized mechanical stop, wherein the at least one motorized mechanical stop is adapted to obstruct the free movement of the collective pitch lever. The at least one motorized mechanical stop may be adapted to counter a free continuation of an upward pivoting movement of the collective pitch lever as soon as the at least one power limitation is reached or exceeded. The at least one power limitation may comprise one of a power limitation of a transmission of the helicopter or a power limitation of at least one turboshaft engine of the helicopter. The method may further comprise bypassing the at least one motorized mechanical stop. The method may further comprise bypassing, in an emergency, the at least one motorized mechanical stop using one of a mechanism and a friction coupling.

The invention also provides for a method for controlling a rotor speed of a helicopter in autorotation, the helicopter including flight controls which comprise a computer, at least one motorized mechanical stop, and a collective pitch lever for controlling flight, the method comprising detecting, using the computer, a deviation between a rotor speed limitation and a current speed, and actuating, using the computer, the at least one motorized mechanical stop, wherein the at least one motorized mechanical stop is adapted to obstruct the free movement of the collective pitch lever. The method may further comprise inputting into the computer a maximum rotor speed setting, wherein the at least one motorized mechanical stop is adapted to counter a free continuation of a downward pivoting movement of the collective pitch lever as soon as the maximum rotor speed setting is reached or exceeded. The method may farther comprise bypassing the at least one motorized mechanical stop. The method may further comprise bypassing, in an emergency, the at least one motorized mechanical stop using one of a mechanism and a friction coupling.

The invention also contemplates a device for assisting in controlling at least one power limitation of at least one turboshaft engine of a helicopter, the device comprising a computer, a collective pitch lever, and at least one motorized mechanical stop controlled by the computer, wherein the at least one motorized mechanical stop is adapted to obstruct the free movement of the collective pitch lever. The at least one motorized mechanical stop may be adapted to counter a free continuation of an upward pivoting movement of the collective pitch lever. The computer may be programmed to detect a deviation between the at least one power limitation and at least one corresponding power parameter. The computer may be adapted to select a greater one of the at least one power limitation and the at least one power parameter. The computer may be adapted to actuate the at least one motorized mechanical stop as soon as the at least one power limitation is reached or exceeded. The device may further comprise a mechanism for bypassing the at least one motorized mechanical stop. The device may further comprise a friction coupling for bypassing, in an emergency, the at least one motorized mechanical stop. The at least one motorized mechanical stop may be part of a motorized mechanical stop system which includes an electric motor, an irreversible reduction gear, at least two electromechanical elements, and a movable element which is adapted to contact each of the at least two electromechanical elements. The motorized mechanical stop system may further include a first shaft coupling the reduction gear to the movable element and a second shaft coupling the movable element to a collective pitch linkage. The motorized mechanical stop system may further include a plate upon which is mounted the at least two electromechanical elements, and wherein the movable element is mounted to the second shaft. The motorized mechanical stop system may further include a plate upon which is mounted the at least two electromechanical elements. The motorized mechanical stop system may further include an electrical system for detecting contact between the at least two electromechanical elements and the movable element. A position of the at least two electromechanical elements may be adjustable. The device may further comprise a friction coupling disposed between the first and second shafts. The device may further comprise a friction coupling disposed between an irreversible reduction gear and at least one of the movable element or the at least two electromechanical elements. The motorized mechanical stop system may further include a safety device disposed between the movable element and a lever which is coupled to a collective pitch linkage, the safety device preventing a mechanical locking.

According to another embodiment, the invention provides for a device for assisting in controlling a rotor speed of a helicopter in autorotation, the device comprising a computer, a collective pitch lever, and at least one motorized mechanical stop controlled by the computer, wherein the at least one motorized mechanical stop is adapted to obstruct the free movement of the collective pitch lever. The at least one motorized mechanical stop may be adapted to counter a free continuation of a downward pivoting movement of the collective pitch lever. The computer may be programmed to detect a deviation between a rotor speed limitation and a current speed. The computer may be programmed with a maximum rotor speed setting and wherein the computer is adapted to actuate the at least one motorized mechanical stop as soon as the maximum rotor speed setting is reached. The device may further comprise a mechanism for bypassing the at least one motorized mechanical stop. The device may further comprise a friction coupling for bypassing, in an emergency, the at least one motorized mechanical stop. The at least one motorized mechanical stop may be part of a motorized mechanical stop system which includes an electric motor, an irreversible reduction gear, at least two electromechanical elements, and a movable element which is adapted to contact each of the at least two electromechanical elements. The motorized mechanical stop system may further include a first shaft coupling the reduction gear to the movable element and a second shaft coupling the movable element to a collective pitch linkage. The motorized mechanical stop system may further include a plate upon which is mounted the at least two electromechanical elements, and wherein the movable element is mounted to the second shaft. The motorized mechanical stop system may further include a plate upon which is mounted the at least two electromechanical elements. The motorized mechanical stop system may further include an electrical system for detecting contact between the at least two electromechanical elements and the movable element. A position of the at least two electromechanical elements may be adjustable. The device may further comprise a friction coupling disposed between the first and second shafts. The device may further comprise a friction coupling disposed between an irreversible reduction gear and at least one of the movable element or the at least two electromechanical elements. The motorized mechanical stop system may further include a safety device disposed between the movable element and a lever which is coupled to a collective pitch linkage, the safety device preventing a mechanical locking.

The invention further provides for a heat-propelled helicopter having a system for assisting in controlling at least one power limitation of a helicopter using a computer, a motorized mechanical stop system having at least one motorized mechanical stop, and a collective pitch lever for controlling flight, the system being adapted to detect, using the computer, a deviation between the at least one power limitation and at least one corresponding power parameter, to select, using the computer, a greater one of the at least one power limitation and the at least one power parameter, and to actuate, using the computer, at least one motorized mechanical stop, wherein the at least one motorized mechanical stop is adapted to obstruct the free movement of the collective pitch lever.

Additionally, the invention provides for a heat-propelled helicopter having a system for controlling a rotor speed of a helicopter in autorotation, the helicopter including flight controls which comprise a computer, a motorized mechanical stop system having at least one motorized mechanical stop, and a collective pitch lever for controlling flight, the system being adapted to detect, using the computer, a deviation between a rotor speed limitation and a current speed, and to actuate, using the computer, the at least one motorized mechanical stop, wherein the at least one motorized mechanical stop is adapted to obstruct the free movement of the collective pitch lever.

A heat-propelled helicopter is also provided which has a system for assisting in controlling at least one power limitation of at least one turboshaft engine of a helicopter, the system comprising a computer, a collective pitch lever, and a motorized mechanical stop system having at least one motorized mechanical stop controlled by the computer, wherein the at least one motorized mechanical stop is adapted to obstruct the free movement of the collective pitch lever.

The invention still further provides for a heat-propelled helicopter having a system for assisting in controlling a rotor speed of a helicopter in autorotation, the system comprising a computer, a collective pitch lever, and a motorized mechanical stop system having at least one motorized mechanical stop controlled by the computer, wherein the at least one motorized mechanical stop is adapted to obstruct the free movement of the collective pitch lever.

BRIEF DESCRIPTION OF THE DRAWINGS

The above object, characteristics and advantages, and still others, will emerge more clearly from the following description and the attached drawings, in which.

DETAILED DESCRIPTION OF THE INVENTION

The drawings will be referred to in order to describe some advantageous, though non-limiting, exemplary embodiments of the motorized mechanical stop device according to the invention.

Figure 1:
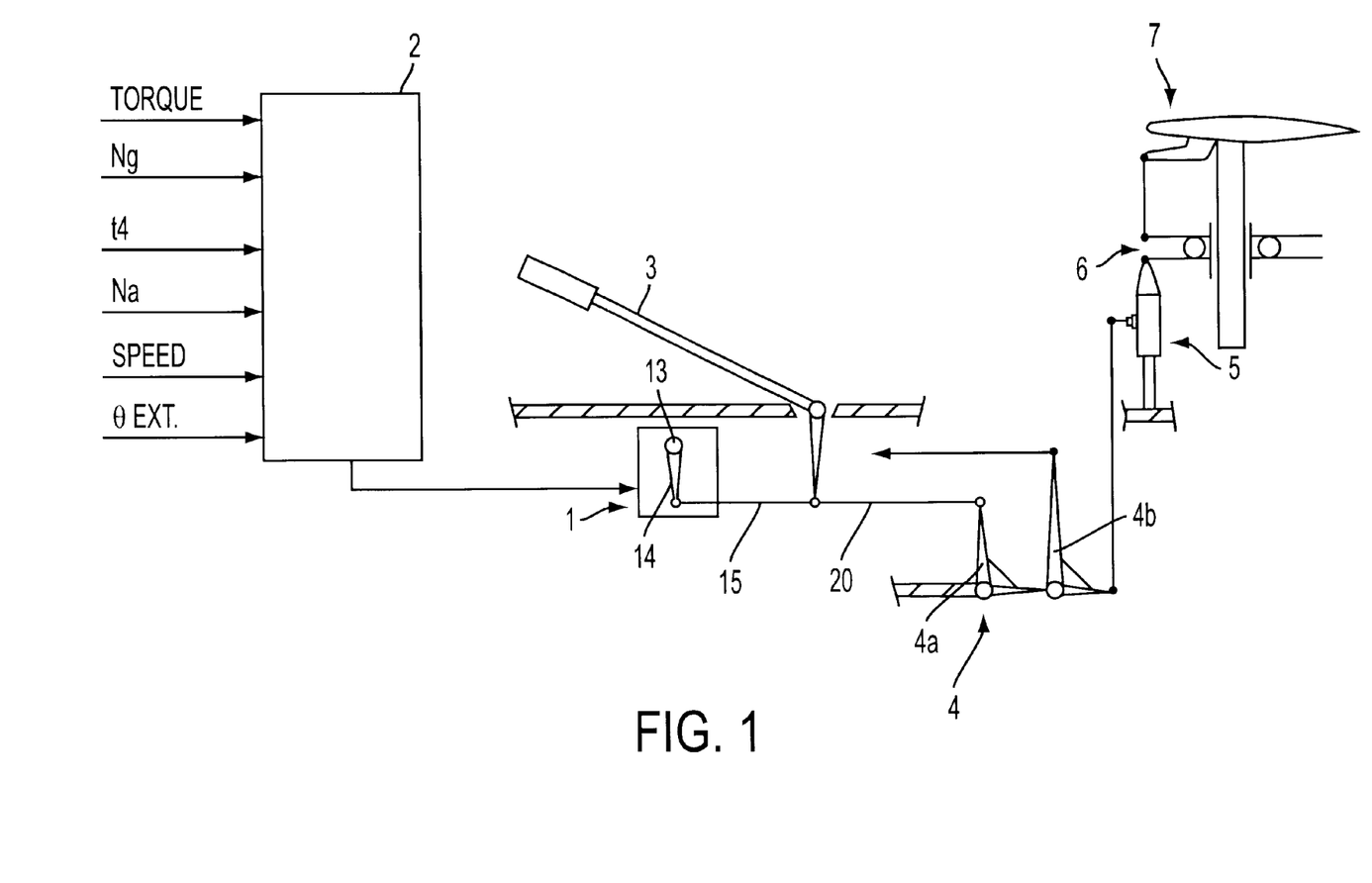
FIG. 1 is a schematic view illustrating the installation of the motorized mechanical stop in the collective pitch control.

The installation of this device in the flight controls is schematically represented in FIG. 1. The motorized mechanical stop system, designated overall by reference 1, is disposed so that its output lever 14 is connected, by a connecting rod 15 to the collective pitch linkage 4a, upstream from a mixing unit or collective/pitch synchronizer 4. A collective pitch lever 3 is itself connected, in the conventional way, by a connecting rod 20, to the synchronizer 4, which comprises the collective pitch linkage 4a and cyclic pitch linkage 4b which controls and is itself connected to the servocontrols 5 in contact with the swash plate 6 of the rotor 7 of the aircraft (only a cyclic control and a servocontrol are schematically represented, in order not to unnecessarily over complicate the drawing). The motorized mechanical stop system is electrically connected to the computer 2.

Figure 2:
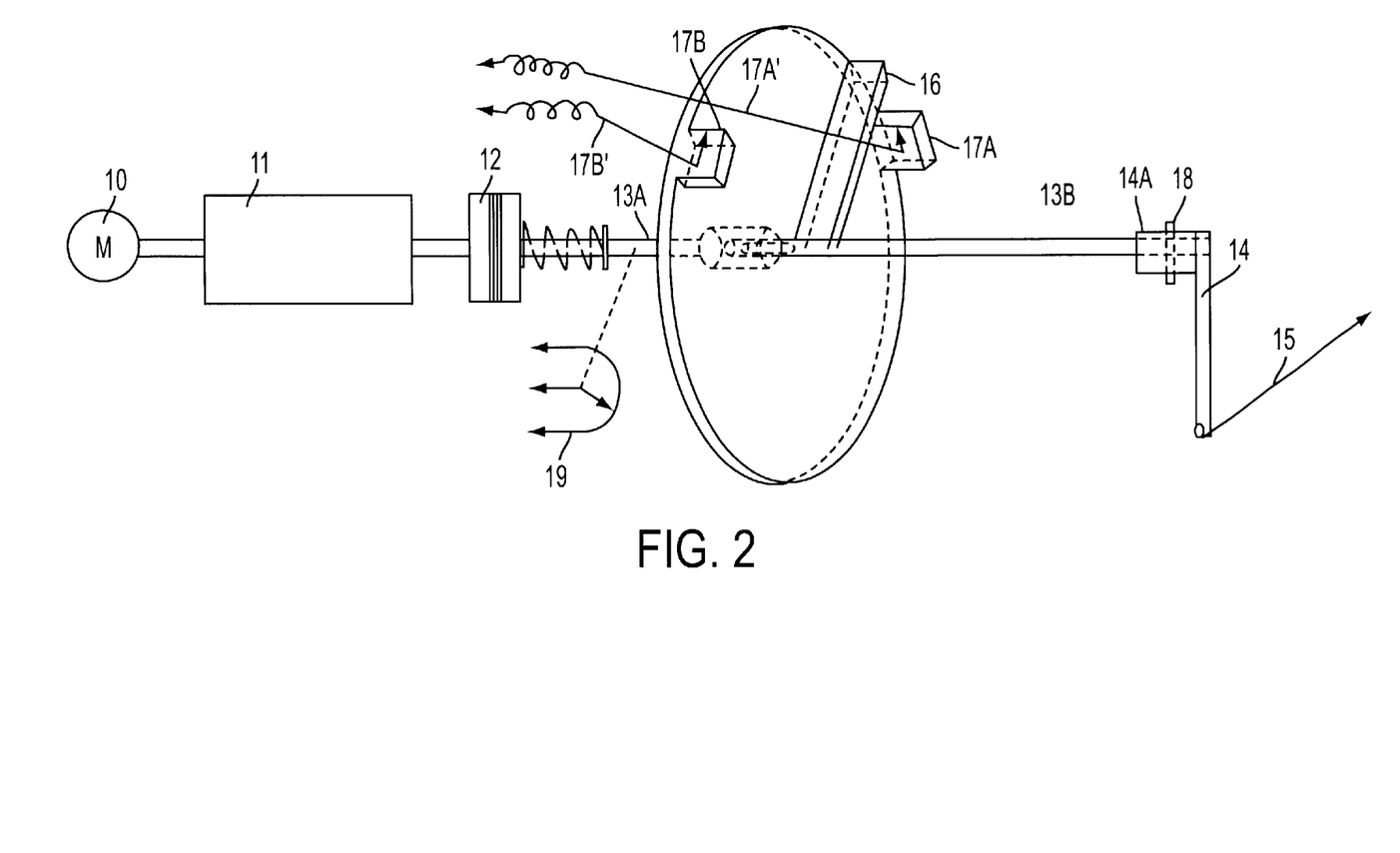
FIG. 2 is a schematic representation of a first exemplary embodiment of the motorized mechanical stop device according to the invention.

A first possible exemplary assembly is represented in FIG. 2. According to this embodiment, the motorized mechanical stop system according to the invention comprises an electric servocontrol 10 controlled by the computer 2 of the helicopter and an irreversible reduction gearbox 11 whose output is connected to one of the ends of a shaft 13A, by a friction coupling 12. The opposite end of the shaft 13A is subject to the two upper and lower stops 17A, 17B. Each of these stops 17A, 17B comprises a contact system 17', 17', which respectively makes it possible to detect when a stopping device 16 integral with a shaft 13B comes into contact with either of them. This shaft 13B is disposed in the extension of the shaft 13A, to which it is linked by a coupling that allows them to move relative to one another. The opposite end of the shaft 13B is integral with one of the ends of the pivoting lever 14, the other end of which is connected, via a rigid jointed connecting rod 15, to the collective pitch linkage 4a.

The linkage between the shaft 13B and the collective pitch lever 3 is such that any pivoting movement of the latter results in a rotation of corresponding amplitude of the shaft 13B.

The position of the stops 17A, 17B, on which the electrical contacts are mounted, is adjustable in accordance with the characteristics of the type of helicopter in which the device of the invention is installed.

The contacts 17A', 17B' of the stops 17A, 17B are electrically connected to the computer 2.

Conventionally, in the remainder of the present description, the stop 17A is considered to be the upper stop (power limitation), while the stop 17B is the lower stop (NR limitation).

The control device according to the invention also comprises:
  a safety device 18 mounted on the connector of the pivoting lever 14 and adapted to prevent any mechanical locking of the device (this safety device can be constituted by a pin that is breakable under a certain moment, for example, when a pressure of force greater than about ten kg is applied to the end of the collective stick and/or collective pitch lever 3),
  a device 19 for copying the position of the stops.

Figure 3:
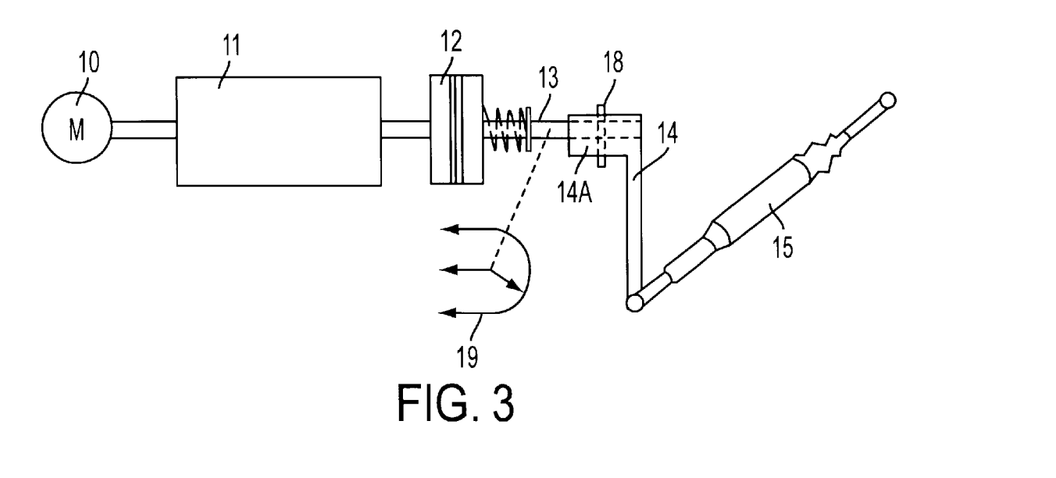
FIG. 3 is a schematic representation of a variant of embodiment of this motorized mechanical stop device.
Figure 4:
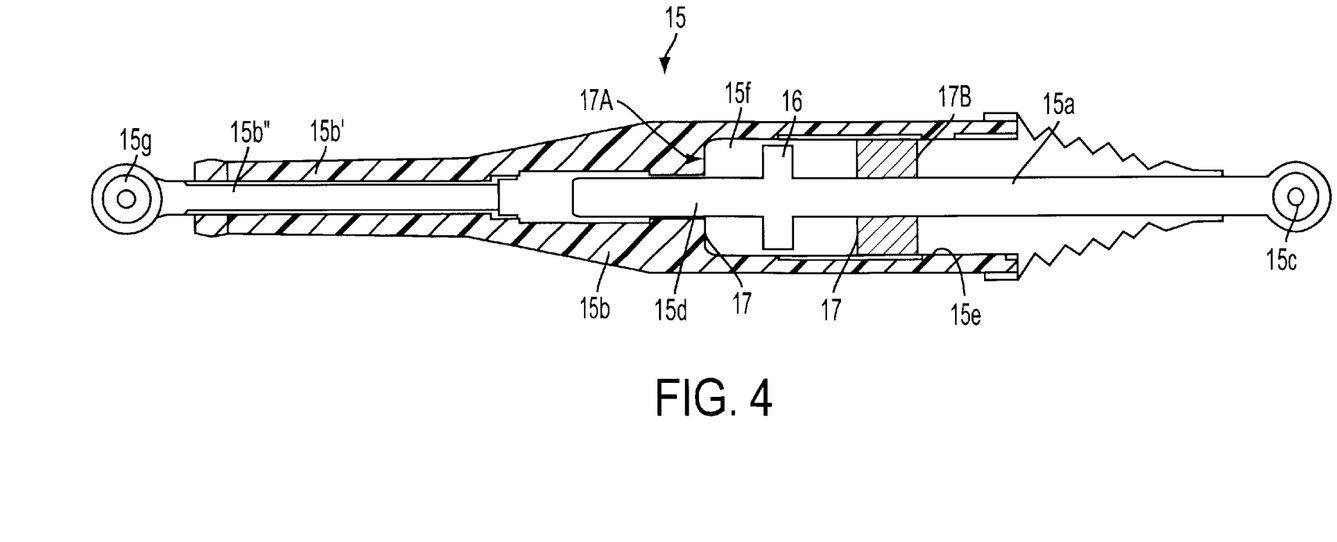
FIG. 4 is a schematic detail on a larger scale of the electromechanical components of this variant of embodiment of the motorized mechanical stop device.
Figure 5:
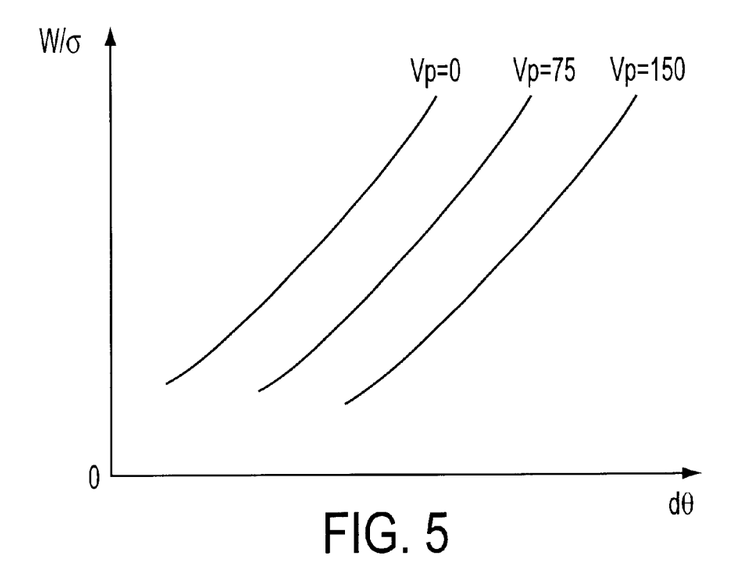
FIG. 5 represents the graph of the curves illustrating the relationship between the collective pitch and the reduced power input.

FIGS. 3 and 4 illustrate a variant of embodiment of the motorized mechanical stop system according to the invention.

In this variant (FIG. 3), the motorized mechanical stop system also comprises an electric servocontrol engine 10 controlled by the computer 2 and an irreversible reduction gearbox 11 whose output is linked to one of the ends of a shaft 13, by a friction coupling 12. The opposite end of the shaft 13 is integral with the lever 14, which is connected by a connecting rod 15, to the collective pitch linkage 4a. This variant differs from the embodiment described above by the fact that the electromechanical components of the stops are incorporated into the connecting rod 15 connecting the pivoting lever 14 and the collective pitch lever 3.

In this case, the connecting rod 15 that incorporates the two stops (upper and lower) is primarily constituted in two parts 15a, 15b assembled with an ability to move axially relative to one another. The part 15a is constituted by a rod, for example, cylindrical, comprising an external end equipped with an eye end 15c connected to the pivoting lever 14, and an opposing internal portion 15d housed with an ability to slide inside the part 15b. The internal portion 15d is equipped with a stopping device 16 that can move between two stops 17A, 17B, whose sides disposed facing one another carry, respectively, the electrical contacts 17A', 17B' (not represented). The stop 17B can be constituted by a threaded bush comprising an axial opening for the passage of the rod 15a and an external threading that allows it to be screwed into an internal threading 15e of the internal lateral wall of a cylindrical recess 15f of one of the end portions of the part 15b. The second stop 17A is constituted by the bottom of the recess 15f in which the stopping device 16 and the bush 17B are housed. It is understood that the embodiment of the stop 17B in the form of a threaded bush allows the position of the latter to be adjusted.

The part 15b of the connecting rod 15 that is connected to the collective pitch lever by an eye end 15g is itself embodied in two parts 15b', 15b'' assembled by screwing, i.e., each part 15b' and 15b'' has threads which engage each other, so as to allow the position of the stop 17A to be adjusted.

In a helicopter, determining the limit pitch that gives the maximum allowable power is complicated; in fact, it depends on several parameters:
  air speed;
  altitude;
  temperature.

Directly determining this limit pitch for each helicopter would require extremely accurate, hence costly, sensors, and a specific calibration of each apparatus; since all helicopters of the same type are not strictly identical, this would not be an economically realistic solution.

Figure 6:
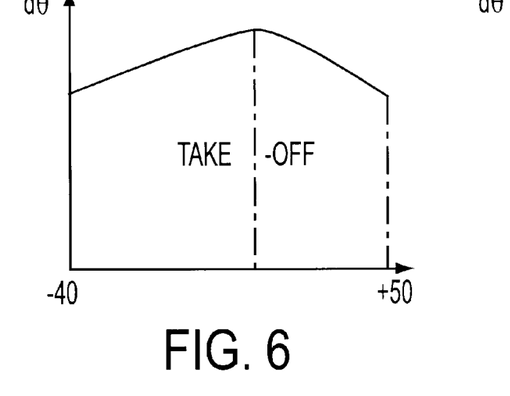
FIGS. 6 and 6a represent these same curves for stationary flight at standard pressure (1013 hPa).
Figure 6A:
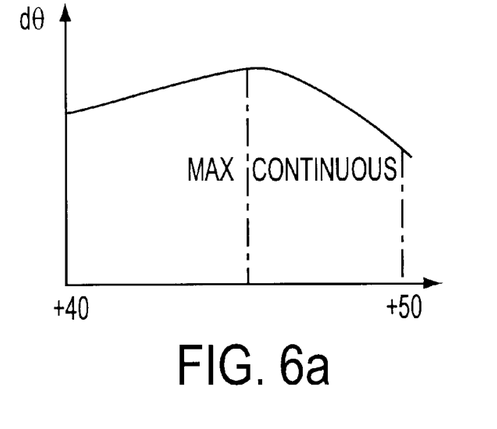

A simpler solution provides for approximately presetting the stop for the most critical type of flight (stationary flight at sea level under standard conditions for the take-off limitations, and climbing under the same conditions for the maximum continuous power limitation) and then leaving it up to the control system to set the stop to the correct value quickly enough not to exceed the acceptable transitory limits on the power levels. It is this solution that is proposed here; i.e., it requires only one speed sensor that operates in an all-or-nothing way at around 55 kt, generally already available in the helicopter. If this solution did not prove fast enough, the stop could then be preset as a function of the exterior temperature, in accordance with the curves of FIGS. 6 and 6a, and this would require the presence of an exterior temperature sensor.

The operating principle is the same in autorotation: the stop can also be preset to a fixed value (e.g., determined by in-flight tests); as soon as the rotor speed reaches the speed setting or the pitch comes into contact with the lower stop (i.e., contact 17B closed), the control system is activated and maintains the rotor speed setting as long as the pilot exerts downward pressure on the collective pitch lever 3.

Upper Stop (Power Limitation)

The stop 17A will be preset as indicated above. The control system will only be rendered operational under three conditions:

when a limitation is reached or exceeded;

when the stop is reached (i.e., closing of the contact 17A' of the stop 17A);

when, in a fast maneuver of the collective pitch, the power limitation is near. For this reason, it is necessary to enter dC/dt, DNg/dt and dt4/dt terms into the computer in order to adjust the preset stop value downward and provide the appropriate choking.

This means that the preset value of the stop will only be modified when one of the three above conditions is fulfilled; if it is modified, this latter position will be saved in memory as long as the device is not reactivated by at least one of the three above conditions.

Lower Stop (NR Limitation)

The fixed value set depends on the helicopter. This preset value must be operative for flight in autorotation, i.e., when the rotor speed is greater than the maximum controlled speed. Here again, in order to cover fast maneuvers and provide the necessary choking, a dNR/dt term will be necessary in order to adjust the position of the stop upward.

Operation of the Control System

It will be recalled that the control system of the stop at the limitation is activated as soon as one of the stops or a limitation is approached too quickly (torque, Ng, t4, or NR).

Under Power

The computer determines the power limitation to be taken into account:

| | |
|---|---|
| Vi < 55 kt | 5 minute limitation |
| Vi > 55 kt | maximum continuous limitation |
| engine failure | emergency limitation |

Figure 7:
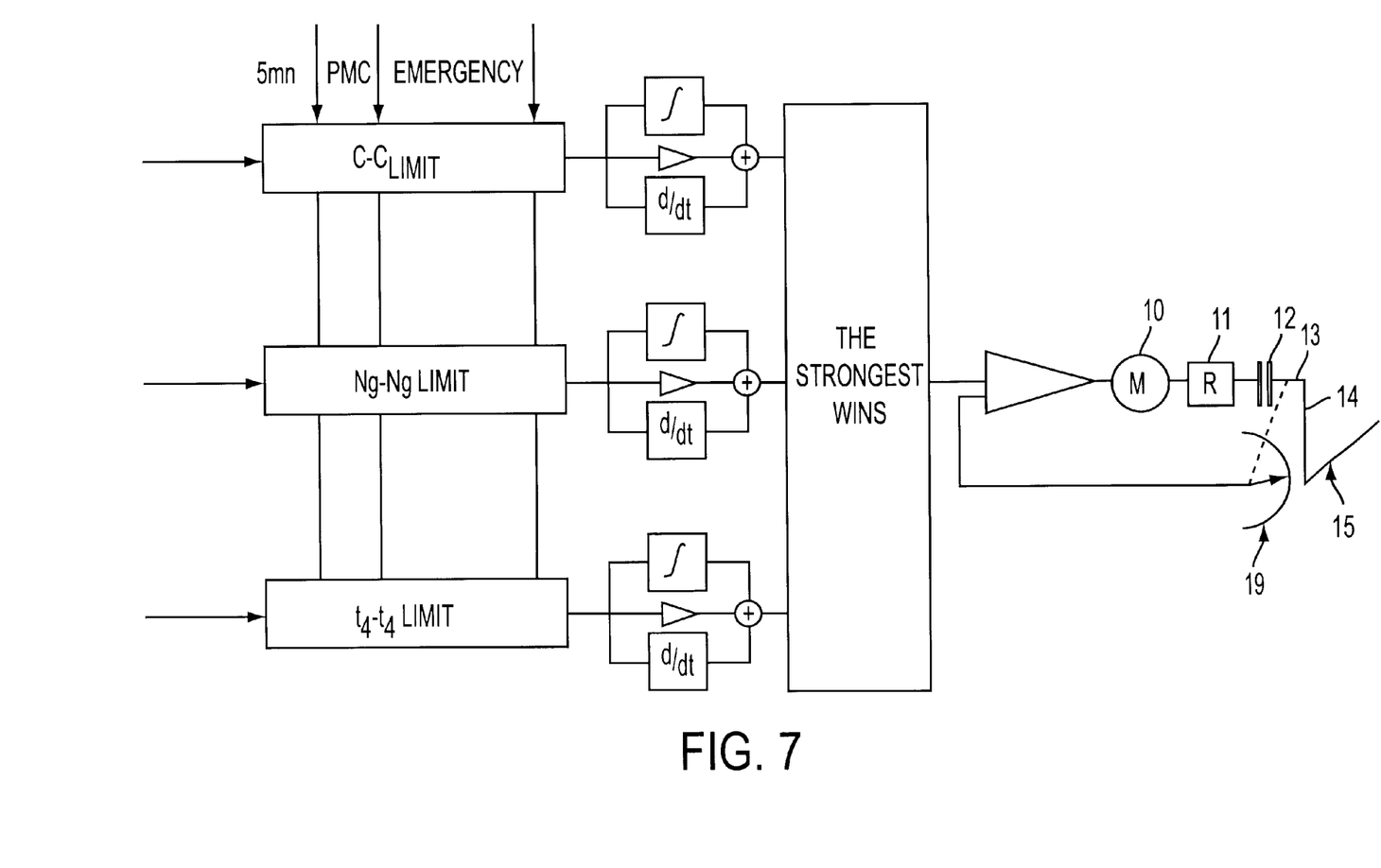
FIG. 7 represents the functional diagram of the control system of the stop at the power limitation, in flight with engine drive.

It then calculates the deviations between the current values and the corresponding limitations (torque, Ng, t4), selects the greatest deviation and sends it to the control system of the engine, associating with it a derived term and an integrated term in order to actuate the displacement of the stop 17A. Thus, the limitation taken into account is the first one reached, and it remains active as long as none of the others exceeds its limit and replaces it, or as long as the contact 17A' of the stop 17A remains closed. The functional diagram of this operation is represented in FIG. 7.

In Autorotation

Figure 8:
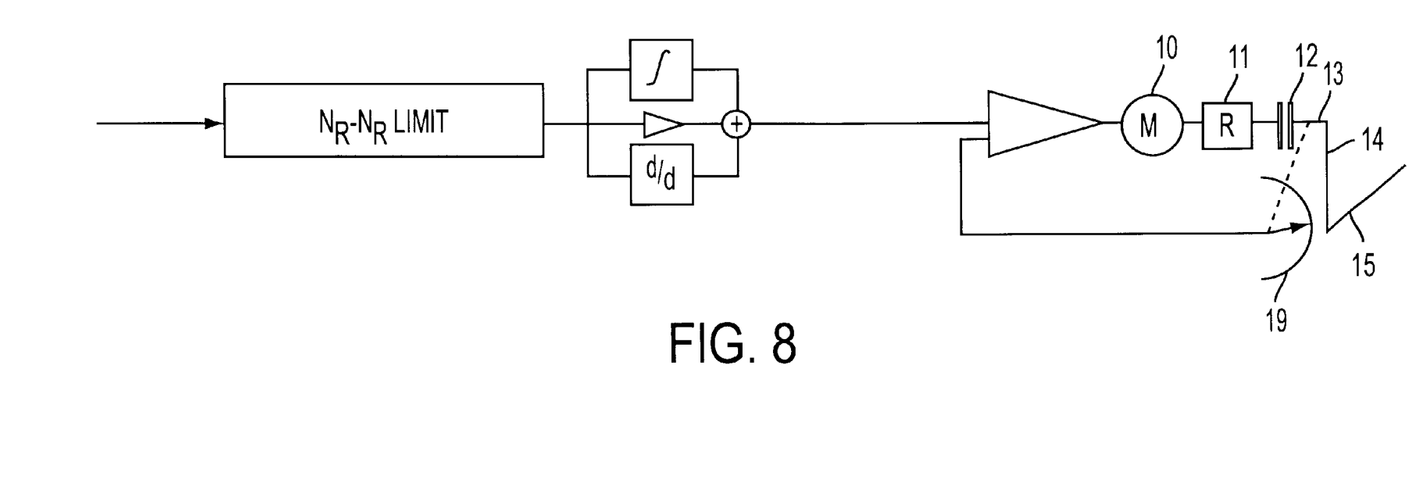
FIG. 8 is a functional diagram of the control system of the stop at the limitation in autorotation.

The diagram is similar and represented in FIG. 8.

What is claimed is:

1. A method for assisting in controlling at least one power limitation of a helicopter using a computer, at least one motorized mechanical stop, and a collective pitch lever for controlling flight, the method comprising:

detecting, using the computer, a deviation between the at least one power limitation and at least one corresponding power parameter;

selecting, using the computer, a greater one of the at least one power limitation and the at least one power parameter; and actuating, using the computer, the at least one motorized mechanical stop, wherein the at least one motorized mechanical stop is adapted to obstruct the free movement of the collective pitch lever.

2. The method of claim 1, wherein the at least one motorized mechanical stop is adapted to counter a free continuation of an upward pivoting movement of the collective pitch lever as soon as the at least one power limitation is reached or exceeded.

3. The method of claim 1, wherein the at least one power limitation comprises one of a power limitation of a transmission of the helicopter or a power limitation of at least one turboshaft engine of the helicopter.

4. The method of claim 1, further comprising bypassing the at least one motorized mechanical stop.

5. The method of claim 1, further comprising bypassing, in an emergency, the at least one motorized mechanical stop using one of a mechanism and a friction coupling.

6. A method for controlling a rotor speed of a helicopter in autorotation, the helicopter including flight controls which comprise a computer, at least one motorized mechanical stop, and a collective pitch lever for controlling flight, the method comprising:

detecting, using the computer, a deviation between a rotor speed limitation and a current speed; and actuating, using the computer, the at least one motorized mechanical stop, wherein the at least one motorized mechanical stop is adapted to obstruct the free movement of the collective pitch lever.

7. The method of claim 6, further comprising:

inputting into the computer a maximum rotor speed setting, wherein the at least one motorized mechanical stop is adapted to counter a free continuation of a downward pivoting movement of the collective pitch lever as soon as the maximum rotor speed setting is reached or exceeded.

8. The method of claim 6, further comprising bypassing the at least one motorized mechanical stop.

9. The method of claim 6, further comprising bypassing, in an emergency, the at least one motorized mechanical stop using one of a mechanism and a friction coupling.

10. A device for assisting in controlling at least one power limitation of at least one turboshaft engine of a helicopter, the device comprising:

a computer;

a collective pitch lever; and at least one motorized mechanical stop controlled by the computer, wherein the at least one motorized mechanical stop is adapted to obstruct the free movement of the collective pitch lever.

11. The device of claim 10, wherein the at least one motorized mechanical stop is adapted to counter a free continuation of an upward pivoting movement of the collective pitch lever.

12. The device of claim 10, wherein the computer is programmed to detect a deviation between the at least one power limitation and at least one corresponding power parameter.

13. The device of claim 12, wherein the computer is adapted to select a greater one of the at least one power limitation and the at least one power parameter.

14. The device of claim 13, wherein the computer is adapted to actuate the at least one motorized mechanical stop as soon as the at least one power limitation is reached or exceeded.

15. The device of claim 10, further comprising a mechanism for bypassing the at least one motorized mechanical stop.

16. The device of claim 10, further comprising a friction coupling for bypassing, in an emergency, the at least one motorized mechanical stop.

17. A device for assisting in controlling at least one power limitation of at least one turboshaft engine of a helicopter, the device comprising:

a computer;

a collective pitch lever; and at least one motorized mechanical stop controlled by the computer, wherein the at least one motorized mechanical stop is adapted to obstruct the free movement of the collective pitch lever, and wherein the at least one motorized mechanical stop is part of a motorized mechanical stop system which includes an electric motor, an irreversible reduction gear, at least two electromechanical elements, and a movable element which is adapted to contact each of the at least two electromechanical elements.

18. The device of claim 17, wherein the motorized mechanical stop system further includes a first shaft coupling the reduction gear to the movable element and a second shaft coupling the movable element to a collective pitch linkage.

19. The device of claim 18, wherein the motorized mechanical stop system further includes a plate upon which is mounted the at least two electromechanical elements, and wherein the movable element is mounted to the second shaft.

20. The device of claim 17, wherein the motorized mechanical stop system further includes a plate upon which is mounted the at least two electromechanical elements.

21. The device of claim 17, wherein the motorized mechanical stop system further includes an electrical system for detecting contact between the at least two electromechanical elements and the movable element.

22. The device of claim 17, wherein a position of the at least two electromechanical elements is adjustable.

23. The device of claim 18, further comprising a friction coupling disposed between the first and second shafts.

24. The device of claim 18, further comprising a friction coupling disposed between an irreversible reduction gear and at least one of the movable element or the at least two electromechanical elements.

25. The device of claim 18, wherein the motorized mechanical stop system further includes a safety device disposed between the movable element and a lever which is coupled to a collective pitch linkage, the safety device preventing a mechanical locking.

26. A device for assisting in controlling a rotor speed of a helicopter in autorotation, the device comprising:

a computer;

a collective pitch lever; and at least one motorized mechanical stop controlled by the computer, wherein the at least one motorized mechanical stop is adapted to obstruct the free movement of the collective pitch lever.

27. The device of claim 26, wherein the at least one motorized mechanical stop is adapted to counter a free continuation of a downward pivoting movement of the collective pitch lever.

28. The device of claim 26, wherein the computer is programmed to detect a deviation between a rotor speed limitation and a current speed.

29. The device of claim 28, wherein the computer is programmed with a maximum rotor speed setting and wherein the computer is adapted to actuate the at least one motorized mechanical stop as soon as the maximum rotor speed setting is reached.

30. The device of claim 26, further comprising a mechanism for bypassing the at least one motorized mechanical stop.

31. The device of claim 26, further comprising a friction coupling for bypassing, in an emergency, the at least one motorized mechanical stop.

32. A device for assisting in controlling a rotor speed of a helicopter in autorotation, the device comprising:

a computer;

a collective pitch lever; and at least one motorized mechanical stop controlled by the computer, wherein the at least one motorized mechanical stop is adapted to obstruct the free movement of the collective pitch lever, and wherein the at least one motorized mechanical stop is part of a motorized mechanical stop system which includes an electric motor, an irreversible reduction gear, at least two electromechanical elements, and a movable element which is adapted to contact each of the at least two electromechanical elements.

33. The device of claim 32, wherein the motorized mechanical stop system further includes a first shaft coupling the reduction gear to the movable element and a second shaft coupling the movable element to a collective pitch linkage.

34. The device of claim 33, wherein the motorized mechanical stop system further includes a plate upon which is mounted the at least two electromechanical elements, and wherein the movable element is mounted to the second shaft.

35. The device of claim 32, wherein the motorized mechanical stop system further includes a plate upon which is mounted the at least two electromechanical elements.

36. The device of claim 32, wherein the motorized mechanical stop system further includes an electrical system for detecting contact between the at least two electromechanical elements and the movable element.

37. The device of claim 32, wherein a position of the at least two electromechanical elements is adjustable.

38. The device of claim 33, further comprising a friction coupling disposed between the first and second shafts.

39. The device of claim 32, further comprising a friction coupling disposed between an irreversible reduction gear and at least one of the movable element or the at least two electromechanical elements.

40. A device for assisting in controlling a rotor speed of a helicopter in autorotation, the device comprising:

a computer;

a collective pitch lever; and at least one motorized mechanical stop controlled by the computer, wherein the at least one motorized mechanical stop is adapted to obstruct the free movement of the collective pitch lever, and wherein the motorized mechanical stop system further includes a safety device disposed between the movable element and a lever which is coupled to a collective pitch linkage, the safety device preventing a mechanical locking.

41. A heat-propelled helicopter having a system for assisting in controlling at least one power limitation of a helicopter using a computer, a motorized mechanical stop system having at least one motorized mechanical stop, and a collective pitch lever for controlling flight, the system being adapted to detect, using the computer, a deviation between the at least one power limitation and at least one corresponding power parameter, to select, using the computer, a greater one of the at least one power limitation and the at least one power parameter, and to actuate, using the computer, at least one motorized mechanical stop, wherein the at least one motorized mechanical stop is adapted to obstruct the free movement of the collective pitch lever.

42. A heat-propelled helicopter having a system for controlling a rotor speed of a helicopter in autorotation, the helicopter including flight controls which comprise a computer, a motorized mechanical stop system having at least one motorized mechanical stop, and a collective pitch lever for controlling flight, the system being adapted to detect, using the computer, a deviation between a rotor speed limitation and a current speed, and to actuate, using the computer, the at least one motorized mechanical stop, wherein the at least one motorized mechanical stop is adapted to obstruct the free movement of the collective pitch lever.

43. A heat-propelled helicopter having a system for assisting in controlling at least one power limitation of at least one turboshaft engine of a helicopter, the system comprising a computer, a collective pitch lever, and a motorized mechanical stop system having at least one motorized mechanical stop controlled by the computer, wherein the at least one motorized mechanical stop is adapted to obstruct the free movement of the collective pitch lever.

44. A heat-propelled helicopter having a system for assisting in controlling a rotor speed of a helicopter in autorotation, the system comprising a computer, a collective pitch lever, and a motorized mechanical stop system having at least one motorized mechanical stop controlled by the computer, wherein the at least one motorized mechanical stop is adapted to obstruct the free movement of the collective pitch lever.

\* \* \* \* \*